United States Patent [19]

Turpin et al.

[11] Patent Number: 5,248,550
[45] Date of Patent: Sep. 28, 1993

[54] ENCAPSULATION OF THERMOPLASTIC PARTICLES FOR PRODUCTION OF COMPOSITES

[75] Inventors: Russell L. Turpin, Canyon Country; Anthony L. Green, Arcadia, both of Calif.

[73] Assignee: Lockheed Corporation, Calabasas, Calif.

[21] Appl. No.: 668,288

[22] Filed: Mar. 12, 1991

Related U.S. Application Data

[60] Continuation-in-part of Ser. No. 541,809, Jun. 23, 1990, abandoned, which is a division of Ser. No. 309,579, Feb. 13, 1989, Pat. No. 4,954,195.

[51] Int. Cl.⁵ .................................. C08F 6/24
[52] U.S. Cl. .................................. 428/278; 428/245; 428/368; 428/408; 428/412; 428/422.8; 428/413; 428/473.5; 428/501; 428/524; 428/364; 427/222; 156/242; 156/244.23; 156/244.27; 156/307.3; 264/136; 264/137; 264/257; 264/258; 264/331.11; 264/331.18; 525/57; 525/58; 525/153; 525/420.5; 525/461; 525/471; 526/202; 528/480
[58] Field of Search ............ 428/368, 412, 278, 422.8, 428/413, 473.5, 501, 524, 364; 156/242, 244.23, 244.27, 307.3; 264/136, 137, 257, 258, 331.11, 331.18; 427/222; 525/57, 58, 153, 420.5, 461, 471; 526/202; 528/480

[56] References Cited

U.S. PATENT DOCUMENTS

| | | | |
|---|---|---|---|
| 4,894,105 | 6/1990 | Dyksterhouse et al. | 156/80 |
| 4,919,739 | 4/1990 | Dyksterhouse et al. | 156/180 |
| 4,943,472 | 7/1990 | Dyksterhouse et al. | 428/113 |
| 4,954,195 | 9/1990 | Turpin | 525/524 |
| 5,128,198 | 7/1992 | Dyksterhouse et al. | 428/240 |
| 5,147,722 | 9/1992 | Koslow | 428/402 |

OTHER PUBLICATIONS

N. L. Allinger et al; Organic Chemistry; 1971; p. 478.

*Primary Examiner*—John Kight, III
*Assistant Examiner*—Rachel Johnson

[57] ABSTRACT

Gel coating of thermoplastic particles, such as polyimide particles, with a polyketone or polyvinyl alcohol gel, and applying the gel coated particles to reinforcement, e.g. carbon, fibers to form a pre-preg. Such gel coated thermoplastic particles can be mixed with a thermosetting resin to form a pre-preg, which can be cured at elevated temperatures to form a composite having damage tolerance characteristics. The gel coating is applied to the thermoplastic particles by contacting such particles with a polymerizable material such as acetone in a weakly acidic solution to cause the acetone to undergo tautomerism, and in the presence of a polymerization promoter or catalyst, preferably certain anionic surfactants such as sulfated ammonium salts, to convert the tautomer to polyacetone gel of low molecular weight, which coats or encapsulates the thermoplastic particles.

20 Claims, No Drawings

ENCAPSULATION OF THERMOPLASTIC PARTICLES FOR PRODUCTION OF COMPOSITES

This application is a continuation-in-part of U.S. application Ser. No. 541,809, filed Jun. 23, 1990, of Russell L. Turpin, now abandoned, which in turn is a division of U.S. application Ser. No. 309,579, filed Feb. 13, 1989, now U.S. Pat. No. 4,954,195.

BACKGROUND OF THE INVENTION

This invention relates to composites containing thermoplastic resins, and particularly to thermoset composites containing a thermoplastic resin additive. The invention is especially directed to encapsulating or coating thermoplastic resin particles to control the physical properties of the thermoplastic or to act as a binder for such particles, and to encapsulating thermoplastic additives for incorporation into thermosets.

U.S. Pat. No. 4,954,195 discloses a process for producing thermoset composites having improved damage tolerance by mixing particles of a thermoplastic such as a polyimide having a specified particle size range, with a hot thermosetting resin such as a bismaleimide, employing up to about 40% of the thermoplastic by weight of the mixture, the particles of thermoplastic being insoluble in the resin mixture. The hot resin dispersion is then applied to fiber reinforcement such as carbon fibers to form pre-pregs, and upon curing the thermoset at elevated temperature the thermoplastic particles dissolve in the thermosetting resin, forming a composite with no definable boundary interfaces between the thermoplastic and thermosetting resins.

While the above process has proved generally successful for the production of improved damage tolerant composites, when relatively large amounts of the thermoplastic particles are used in the mixture with the thermosetting resin, the flow of the liquid thermosetting resin becomes inhibited and also there is a tendency for some of the thermoplastic particles to dissolve undesirably in the thermosetting resin prior to curing thereof. Thus, under these conditions, both the effectiveness of the thermoplastic additive in the thermosetting resin and the processibility of the mixture is reduced.

When fabricating thermoplastic powder impregnated pre-pregs, a solvent slurry of the thermoplastic powder, e.g. a polyimide, is applied to the reinforcement fibers and the solvent is evaporated, permitting the powder to adhere to the reinforcement fibers. In this procedure a solvent is added to the thermoplastic powder as a tackifier to adhere the thermoplastic particles to the fibers in producing the pre-preg. Employing such procedure it is difficult to obtain a consistent product and removal of the solvent is necessary.

The application of gel coats is known in the latex and pharmaceutical industries, e.g. for application to medicinal capsules, as for time release of the medicinal component. However, such concept has heretofore not been applied to resins for the production of thermoplastic and thermosetting resin composites.

An object of the present invention is the provision of improved procedure for the production of thermoplastic and thermosetting composites.

Another object is to provide procedure for controlling the physical properties of the thermoplastic when used as an additive in combination with the thermosetting resin for producing thermoset composites, as in the process of above U.S. Pat. No. 4,954,195.

Still another object is to provide improved procedure for producing thermoplastic impregnated pre-pregs without the use of solvents for the thermoplastic, which require removal after application.

A still further object is the application of gel coatings in the above procedures for producing thermoplastic and thermosetting pre-pregs and composites.

Yet another object is the provision of improved thermoplastic and thermoplastic-thermosetting pre-pregs and composites employing the above procedures.

Other objects and advantages of the invention will be apparent from the description below of the invention.

SUMMARY OF THE INVENTION

The above objects and advantages are achieved, according to the invention, by gel coating thermoplastic particles and applying the gel coated thermoplastic resin particles to reinforcement fibers such as carbon fibers to form a pre-preg. Such gel coat can be formed using polymerizing solvents such as acetone, to form a polyether.

The use of a gel coat over the thermoplastic particles results in several advantages. When such gel coated thermoplastic particles are used in conjunction with a thermosetting resin to produce pre-pregs and cured composites, as in the process of above U.S. Pat. No. 4,954,195, it permits the control of the physical interactions between the thermoplastic and thermosetting components in the composite matrix while increasing the processibility of the mixture and increasing the amount of thermoplastic component which can be added to the thermosetting resin without dissolution of the thermoplastic component in the thermosetting resin during dispersion of the thermoplastic component in the thermosetting resin and prior to curing. Thus, when used with a thermosetting resin, the gel coated thermoplastic will aid in controlling properties such as solubility, agglomeration, particle size and phase interfaces. The chemical nature or structure of the gel coat allows it to melt and cure and co-react with the matrix thermoplastic and thermosetting matrix resins. Once reacted with the cured matrix, the reacted gel coating does not hinder the performance of the composite.

When used as a gel coat on thermoplastic particles for producing thermoplastic impregnated pre-pregs of such thermoplastic particles on a reinforcement fiber such as carbon fiber, the gel coating on the thermoplastic particles functions as the binder between the thermoplastic and the fiber, without the presence of residual solvents which require removal.

The main novel feature of the invention is accordingly the use of a meltable and curable gel coat on thermoplastic particles for production of thermoplastic and thermosetting pre-pregs and composites.

DETAILED DESCRIPTION OF THE INVENTION AND PREFERRED EMBODIMENTS

According to the invention, thermoplastic particles such as polyimide particles are gel coated using polymerizing solvents, a preferred solvent of this type being a ketone, particularly acetone, to form a polyether gel. For this purpose any ketone, which in a weakly acidic solution will first undergo tautomerization followed by polymerization of the tautomer using a suitable catalyst, can be employed. Ketones having these characteristics have the formula CH₃COR, where R is an aliphatic group containing from 1 to about 9 carbon atoms, e.g. methyl, ethyl, propyl, butyl, etc.

In addition to ketones as defined above, other compounds containing a double bond between adjacent carbon atoms and which will undergo tautomerization followed by polymerization to form a low molecular weight gel can be employed. Thus, for example, a vinyl compound such as a vinyl ester, e.g. vinyl acetate or vinyl butyrate, can be employed, which can undergo tautomerization and polymerization to polyvinyl alcohol (PVA). Alternatively, PVA per se can be employed. The compound employed provides a low molecular weight gel moiety, which either cures during curing of the composite as in the case of the polyether derived from acetone, or which melts off, as in the case of PVA. However, the invention will be described hereinafter principally in terms of a ketone, particularly acetone, as polymerizing or gel forming agent.

Various thermoplastics have been found suitable for use in the invention process. A preferred thermoplastic is polyimide thermoplastic, for example, the material Matrimide 5218 marketed by Ciba-Geigy. Other thermoplastics which can be employed include polysulfone thermoplastics, such as polyphenylene sulfide, polyether sulfone, and polyaryl sulfone, polyether ketone, and also polycarbonate, or mixtures thereof.

The requirements for tautomerization of the ketone to its enol form, and for catalytically polymerizing the latter to form the gel, are that the reaction take place under weakly acidic conditions, preferably at a pH between about 4 and about 5, to form the enol, and in the presence of a catalyst to promote polymerization of the enol to the gel, using known emulsion polymerization techniques.

By the term "weakly acidic" solution or conditions which can be employed for this purpose is meant any weak acid or buffering agent to provide a ketone solution having a pH of about 4 to about 5. These can include acetic acid, e.g. a water solution buffered with acetic acid, a phosphate such as NaH₂PO₄, and a bisulfate such as NaHSO₄. Also, methylene chloride can be employed. The reaction is carried out under weakly acidic conditions since undesirable reactions can occur in a strong acid.

The polymerization reaction is promoted or catalyzed by emulsion polymerization techniques preferably employing certain anionic surfactants such as sulfated ammonium salts or phosphate esters. Suitable surfactants of this type are the material marketed as Alipal CO-436, believed to be a monyl phenol ethoxylate sulfate ester ammonium salt, and Alipal RE-960, believed to be a phosphate ester of an aromatic compound, both of such anionic surfactant materials being marketed by Rhone-Poulenc of Princeton, N.J. However, any surfactant which will promote polymerization of the enol or tautomeric form of the ketone to the gel polymer can be employed.

The general scheme of the reaction for producing a polyether gel from acetone is as follows:

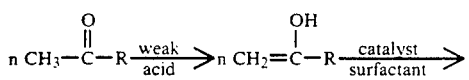

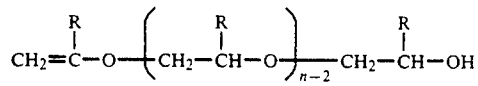

where n is about 2 to about 100.

The thermoplastic particles to which the gel coating is to be applied according to the invention are preferably ground to a particle size of about 10 to about 80 microns. According to one mode of procedure, the thermoplastic particles are dissolved in methylene chloride, functioning as buffering agent to obtain a pH in the range of about 4 to about 5 with heptane added as precipitating agent for the thermoplastic. The ketone, e.g. acetone, and the surfactant or catalytic agent to polymerize the tautomer are then added. The reaction takes place at room temperature, but the temperature can vary. The gel coated particles of thermoplastic precipitate from solution.

However, if the thermoplastic particles are coated directly and heptane is not required as a precipitating agent, the buffering agent and the surfactant can first be added, followed by addition of the acetone. The reaction proceeds at about room temperature, e.g. for about an hour to precipitate the gel on the thermoplastic particles.

After the reaction is completed and the particles are coated, they are filtered and dried. The gel formed on the thermoplastic particles is of low molecular weight, e.g. ranging from about 300 to about 4,500 employing acetone as the gel forming component.

The concentration of the acetone used depends on the thermoplastic particle size and shape. Spherical particles will require less ketone, e.g. acetone, than non-spherical particles. As the particles become more irregular, the concentration of the ketone must be increased to obtain a good gel coating on the particles. For thermoplastic particles of a size ranging from 10 to 80 microns, the concentration of ketone, e.g. acetone, can range from 50 to 150 mls. per 70 grams of thermoplastic. Thus, for small spherical thermoplastic particles within the above particle size range, 50 to 70 mls of ketone per 70 gms of thermoplastic can be used, and for irregular thermoplastic particles, 75 to 150 mls ketone are utilized per 70 grms of thermoplastic. Thus, for example, 50 mls of acetone per 70 grams of 20 micron spherical thermoplastic particles, and 90 mls of acetone per 70 grams of 20 micron irregular thermoplastic particles can be employed.

After the gel coating process is completed, and while the gel coated particles are in a solvent or water based solution, reinforcement fibers such as carbon fibers, fiberglass, or the like, are contacted with the solution by passage of the fibers through the solution, to produce a pre-preg or tape wherein both the gel binder and the thermoplastic particles become attached to the reinforcement fibers. The impregnated pre-preg or tape is then dried. A plurality of such tapes can be formed into a laminate.

As previously noted, the gel forming material also can be a vinyl ester which can be polymerized in the presence of the thermoplastic particles to form a PVA gel coating, under substantially the same reaction conditions as for a ketone, as described above. However, as a matter of convenience, commercially available PVA can be applied directly to the thermoplastic particles. Thus, for example, 50–150 mls of PVA can be added to a water base solution buffered to a pH of about 5, and 70 grams of thermoplastic particles can be added, the amount of PVA depending on the uniformity of the thermoplastic particles, the more irregular the particles, the larger the amount of PVA employed. Reinforcement fibers such as carbon fibers can then be passed through the solution and the gel coated PVA particles deposit on the fibers to form a pre-preg as described above, or gel coated PVA particles can be precipitated from solution and mixed with a thermosetting resin to form a hybrid thermosetting-thermoplastic pre-preg and composite as described above.

To make a thermoset the gel coated thermoplastic particles of the invention are mixed with a thermosetting resin according to the process of above U.S. Pat. No. 4,954,195. The result is a hybrid part thermosetting-part thermoplastic composite of enhanced damage tolerance over that of the thermoset per se, without adversely affecting the mechanical properties of the thermoset.

Various thermosetting resins are suitable for use as the base resin matrix. While bismaleimide is the preferred thermoset, other thermosets including, for example, epoxy, epoxy novolak, isocyanurate, acrylate, methacrylate, acetylene-terminated resins, and mixtures thereof, can be employed.

The spheres or particles of gel coated thermoplastic, such as polyimide, preferably of a size ranging from about 10 to about 80 microns, are mixed with the hot thermoset resin, such as bismaleimide, to form a uniform dispersion of the resin mixture. For this purpose, usually the thermoset resin, in the absence of solvent, is heated at a temperature so that the thermoset resin is in liquid form, e.g., 150° to 200° F., and the gel coated thermoplastic particles are added gradually to the hot liquid thermoset resin while the mixture is subjected to stirring. The amount of gel coated thermoplastic resin particles added to the thermoset resin can range from about 5 to about 40%, preferably about 10 to about 30%, by weight of the mixture of thermoset and gel coated thermoplastic resins.

The resulting resin mixture of thermoset matrix resin, e.g., bismaleimide, and gel coated thermoplastic filler particles, e.g., polyimide particles, can be cooled and applied to reinforcement fibers, e.g., carbon fiber, fiberglass, or the like, in known manner, to produce a pre-preg tape or fabric. A plurality of such tapes can be formed into a laminate and the resulting laminate of pre-preg tapes then subjected to curing, as by heating at a temperature, e.g., of the order of about 350° F., and under pressure, e.g., about 85 psi.

The gel coated thermoplastic particles should be insoluble in the base thermosetting resin at room temperature and at higher processing temperatures achieved prior to curing, e.g., ranging from about 140° to about 230° F. The gel coated thermoplastic particles, however, should be subsequently soluble in the base resin during curing at substantially elevated temperatures. Thus, at room temperature or at normal pre-preg processing temperature, e.g., 150° F., the solubility of the gel coated thermoplastic in the thermoset resin is so low that such thermoplastic particles will not agglomerate in the thermoset. However, when temperature is increased under curing conditions, e.g., up to 350° F. and under a pressure of 85 psi, the gel coated thermoplastic particles become soluble in the base thermoset resin and will readily pass into solution therein.

The resulting composite material obtained is both damage tolerant as afforded by the gel coated thermoplastic filler, without affecting the mechanical properties of the thermoset, and is thermally stable. As previously noted, the gel formed from the ketone on the thermoplastic particles cures when the composite cures and forms an integral part of the composite.

It has been found that a larger amount of thermoplastic with respect to thermoset can be employed when the thermoplastic particles are gel coated according to the invention, to enhance the damage tolerance characteristics of the resulting composite. However, in the case of the non-gel coated thermoplastic particles of the above patent, if the amount of thermoplastic used approaches or is somewhat above about 10% by weight of the mixture of thermosetting and thermoplastic resins, flow of the liquid thermosetting resin is inhibited, and there is a tendency for some of the thermoplastic particles undesirably to dissolve in the thermosetting resin prior to curing. The gel coating on the thermoplastic particles according to the present invention provides assurance that the thermoplastic particles will not dissolve in the thermoset until the cure cycle when using up to 40% of the gel coated thermoplastic particles by weight of the mixture of the thermoplastic and thermosetting resins.

The following are examples of practice of the invention.

EXAMPLE 1

½ gallon of acetone is premixed with ½ gallon distilled water. A 10% by weight solution of Matrimide 5218 in methylene chloride is provided. Distilled water, 493 gms, is placed in a container and stirred until a vortex is formed. 1.64 gms of Alipal CO-436 is added dropwise to the container with thorough mixing, and 750 gms of the Matrimide 5218/methylene chloride solution is added at a rate of 70-80 ml/minute, the solution being dripped into the vortex of the stirring mixture. Concurrently with the Matrimide 5218/methylene chloride addition, an additional 3.30 gm of Alipal CO-436 is added dropwise to the stirred mixture. About 383 ml of heptane is added to the mixture at a rate of 70 ml/minute, with stirring continued for 10-15 minutes. Then 75-100 ml of acetone is added to the mixture in the container and mixed for one hour. The resulting suspension contains polyether gel coated polyimide thermoplastic particles. The reaction mixture is filtered while stirring is continued. The filtrate is washed with the premixed acetone-water solution a minimum of three times until foaming through the filter ceases. The filtrate is placed on a drying tray and dried for 30-40 minutes at about 125° F. with full vacuum. The dried material is ground on a mortar and pestle and the powder passed through a sieve. The material not passing through is re-ground. The ground material is in the form of polyimide thermoplastic particles coated with a polyacetone gel.

EXAMPLE 2

½ gallon of acetone is premixed with ½ gallon of distilled water. In a separate container 493 gms of distilled water is buffered by addition of $NaH_2PO_4$ to a pH of 5.0. While stirring the latter container, about 1.64 gms of Alipal CO-436 is added dropwise and 95 gms of polyimide thermoplastic particles is added, the particles being non-spherical and of a size ranging from about 20 to about 40 microns. As stirring is continued, another 3.30 gms of Alipal CO-436 is added dropwise to the container. After stirring for an additional 5 minutes, 100-125 ml of acetone is added, and mixing is continued for one hour. The reaction mixture is then filtered, while continuing stirring of the reaction mixture. The filtrate is washed with the premixed acetone-water solution a minimum of three times until foaming through the filter ceases. The filtrate is placed on a drying tray and dried for 30-40 minutes at about 125° F. with full vacuum. The dried material is ground on a mortar and pestle and the powder passed through a sieve. The material not passing through is re-ground. The ground material is in the form of polyimide thermoplastic particles coated with a polyether gel.

EXAMPLE 3

The polyether gel coated polyimide thermoplastic particles of Example 1 while suspended in the gel coating bath, have a carbon reinforcement tape passed through the suspension. The impregnated tape is permitted to dry by evaporation of solvent, resulting in a pre-preg in which the gel coating binds the thermoplastic particles to the carbon fibers.

EXAMPLE 4

A heated mixture or composition of bismaleimides is formed of a first bismaleimide (BMI #1) marketed as Compimide 796 and a second bismaleimide (BMI #2) marketed as Compimide 353, both by Technochemie, a subsidiary of Shell Oil Company, in a ratio of about 4 parts of BMI #1 to 3 parts of BMI #2, by weight.

The above components of the BMI composition are combined in a one gallon mixing vessel while stirring constantly until a one-phase solution is obtained. The final mixture is brought to 80° C. and 565 grams of the gel coated polyimide thermoplastic particles, prepared as described above in Example 1 (20% by weight of the mixture of polyimide and bismaleimide composition), is stirred into the liquid bismaleimide mixture. A uniform dispersion of the insoluble non-agglomerated gel coated polyimide particles in the bismaleimide liquid resin is obtained, and the resin is cooled to room temperature. The gel coated thermoplastic particles act as a filler for the bismaleimide resin system to which it is added.

The resin dispersion is then applied as a film to carbon fiber tape to form a pre-preg tape. The carbon fiber pre-preg tapes so prepared are laminated to form a laminate by compaction, and the compacted laminate is then subjected to curing at 350° F. and 85 psi pressure to form a composite in which the gel coated polyimide particles are dissolved within the bismaleimide thermoset matrix with no clear lines of demarcation between the polyimide thermoplastic particles and the bismaleimide thermoset matrix. The controlled solubility of the gel coated polyimide particles in the bismaleimide resin results in a cured composite having enhanced damage tolerance and good thermal stability, water resistance, and mechanical properties.

EXAMPLE 5

500 grams of distilled water and 1.0 gram of a defoaming agent such as octyl alcohol that has been shown to promote suspension polymerization, are placed in a 4 liter beaker. A pre-mixed 10% by weight solids solution of polyimide thermoplastic, marketed as Matrimid 5218 in methylene chloride, or other solvent compatible with the thermoplastic, is prepared. The beaker of distilled water is placed on a stirrer plate and the contents stirred, adjusting the speed until a vortex is formed.

750 grams of the thermoplastic solution is dripped into the water at a rate of 70-80 ml/min. Simultaneously, 1.5 grams of the defoaming agent is added dropwise over the same time period. When all of the thermoplastic solution has been added, the funnel used for feeding the thermoplastic solution to the water is washed into the beaker with the methylene chloride solvent used for the solution. The solution is mixed at a high shear rate for 5 minutes, and during this period 390 mls of heptane is added at a rate of 70 ml/min. Precipitation of the thermoplastic in the water occurs, 50 ml of vinyl butyrate is added. Stirring of the suspension is continued at high speed for 45-60 minutes after addition of all material.

The precipitate is vacuum-filtered in a Beuchner funnel, while continuously stirring the suspension being filtered. The filtrate is washed with a 50/50 solution of acetone/water three times or until foaming ceases. The filtrate is placed in a drying pan and dried for 45 minutes at 450° F. and full vacuum. After the thermoplastic material is dried, the material is lightly ground in a mortar and pestle and passed through a 125 mesh screen. Any particles not passing through the screen can be reground and sieved. The ground thermoplastic powder, which can be used as a filler in a thermosetting resin, is produced in a yield of about 98% of the filtrate and 130% of the starting weight. The resulting thermoplastic particles have a polyvinyl alcohol gel coating and are of spherical shape and are of a size ranging from about 20 to about 40 microns.

EXAMPLE 6

The procedure of Example 5 is followed, except employing 50 ml of acetone in place of the vinyl butyrate.

Essentially the same results are obtained, except that the resulting thermoplastic particles have a polyacetone gel coating.

From the foregoing it is seen that the invention provides a process for gel coating thermoplastic particles for use in fabricating improved thermoplastic fiber reinforcement pre-pregs and thermoset pre-pregs and composites having enhanced damage tolerance. The process provides greater tack and flow control of resin in the production of thermoset composites.

While particular embodiments of the invention have been described for purposes of illustration, it will be understood that various changes and modifications within the spirit of the invention can be made, and the invention is not to be taken as limited except by the scope of the appended claims.

What is claimed is:

1. In a process for producing resin composites, the steps which comprise
    applying a gel coating on particles of a thermoplastic resin, said gel coating being a polyether and said thermoplastic resin selected from the group consisting of polyimide, polyphenylene sulfide, polyether sulfone, polyaryl sulfone, polyether ketone and polycarbonate, and mixtures thereof, said gel coating being applied to said particles of thermoplastic resin by contacting said particles with a weakly acidic solution containing a ketone in the presence of a polymerization promoting surfactant, and
    applying the gel coated thermoplastic resin particles to reinforcement fibers to form a pre-preg.

2. The process of claim 1, including forming a laminate from a plurality of said pre-pregs.

3. The process of claim 1, said ketone, in a weakly acidic solutions having the formula $CH_3COR$, where R is an aliphatic group containing from 1 to about 9 carbon atoms.

4. The process of claim 3, said weakly acidic solution, comprising a member selected from the group consisting of acetic acid, a phosphate, a bisulfate and methylene chloride, and providing a pH of between about 4 and about 5, said polymerization promoting surfactant being an anionic surfactant selected from the group consisting of sulfated ammonium salt and phosphate ester surfactants.

5. The process of claim 1, wherein the gel coated thermoplastic resin particles are applied in solution to said reinforcement fibers and the solvent evaporated to form a gel coating on said reinforcement fibers, the gel coating providing a binder adhering the thermoplastic resin particles to said reinforcement fibers.

6. The process of claim 1, wherein said thermoplastic resin is a polyimide and said reinforcement fibers are carbon fibers.

7. The process of claim 3, wherein said ketone is acetone, employing a solution having a concentration of 50 to 100 ml acetone per 70 grams of thermoplastic particles, and said thermoplastic particles being of a size ranging from about 10 to about 80 microns, the molecular weight of said gel coating ranging from about 300 to about 4,500.

8. In a process for producing thermoset composites, the steps which comprise
   applying a gel coating on particles of a thermoplastic resin, said gel coating being a polyether derived from a ketone by tautomerization thereof followed by polymerizing the tautomer, and said thermoplastic resin selected from the group consisting of polyimide, polyphenylene sulfide, polyether sulfone, polyaryl sulfone, polyether ketone and polycarbonate, and mixtures thereof,
   providing a base thermosetting resin curable by heating, said thermosetting resin selected from the group consisting of bismaleimide, epoxy, epoxy-novolak, isocyanurate, acrylate and methacrylate resins, acetylene-terminated resins, and mixtures thereof, said gel coated thermoplastic resin particles being insoluble in said thermosetting resin at room temperature and at elevated processing temperature prior to curing, but soluble in said thermosetting resin at cure conditions thereof,
   mixing said gel coated particles of thermoplastic resin and said thermosetting resin in liquid form in a proportion of about 5% to about 40% of said thermoplastic resin by weight of said mixture, and forming a substantially uniform dispersion of said gel coated thermoplastic resin particles and thermosetting resin,
   applying said mixture of gel coated thermoplastic resin and thermosetting resin to reinforcement fibers and forming a pre-preg.

9. The process of claim 8, including curing the thermosetting resin by heating at elevated temperature, said gel coated thermoplastic resin particles dissolving in said base thermosetting resin during curing.

10. The process of claim 9, the particle size of said thermoplastic resin particles ranging from about 10 to about 80 microns.

11. The process of claim 8, wherein said reinforcement fibers comprise a carbon fiber tape, forming a pre-preg tape, assembling a plurality of plies of said pre-preg tape in the form of a laminate, and curing said laminate under heat and pressure.

12. The process of claim 8, said thermoplastic resin being a polyimide and said thermosetting resin being a bismaleimide, and wherein said reinforcement fibers comprise carbon fibers.

13. A pre-preg for producing resin composites which comprises
   reinforcement fibers and
   gel coated particles of a thermoplastic resin in contact with said fibers, said gel coating being a polyether, and said thermoplastic resin selected from the group consisting of polyimide, polyphenylene sulfide, polyether sulfone, polyaryl sulfone, polyether ketone and polycarbonate, and mixtures thereof.

14. A composite comprised of a laminate of a plurality of pre-pregs as defined in claim 13.

15. The pre-preg of claim 13, the gel coating on said thermoplastic particles being formed by reacting a weakly acidic solution containing a ketone in the presence of a polymerization promoting surfactant.

16. A pre-preg for producing thermoset composites which comprises
   reinforcement fibers and
   a mixture of gel coated particles of a thermoplastic resin, and a thermosetting resin, in a proportion of about 5% to about 40% of said thermoplastic resin, by weight of the mixture, in contact with said fibers, said gel coating being a polyether derived from a ketone by tautomerization thereof followed by polymerizing the tautomer, and said thermoplastic resin selected from the group consisting of polyimide, polyphenylene sulfide, polyether sulfone, polyaryl sulfone, polyether ketone and polycarbonate, and mixtures thereof, and said thermosetting resin selected from the group consisting of bismaleimide, epoxy, epoxy-novolak, isocyanurate, acrylate and methacrylate resins, acetylene-terminated resins, and mixtures thereof.

17. The pre-preg of claim 16, the gel coating on said thermoplastic particles being formed by reacting a weakly acidic solution containing a ketone in the presence of a polymerization promoting surfactant.

18. The pre-preg of claim 16, said thermoplastic resin being a polyimide and said thermosetting resin being a bismaleimide.

19. A thermoset composite comprised of a cured pre-preg as defined in claim 16.

20. A thermoset composite comprised of a cured laminate of a plurality of pre-pregs as defined in claim 16.

* * * * *